(12) United States Patent
Meehan et al.

(10) Patent No.: US 10,789,522 B2
(45) Date of Patent: Sep. 29, 2020

(54) NEAR-FIELD COMMUNICATION DEVICE WITH ANTENNA ON ELONGATED PRINTED INTERCONNECT

(71) Applicant: Palo Alto Research Center Incorporated, Palo Alto, CA (US)

(72) Inventors: Nicholas Meehan, Mountain View, CA (US); Shiveesh Fotedar, Palo Alto, CA (US); Michael Kuniavsky, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/213,224

(22) Filed: Dec. 7, 2018

(65) Prior Publication Data

US 2020/0184297 A1 Jun. 11, 2020

(51) Int. Cl.
*G06K 19/07* (2006.01)
*G06K 19/077* (2006.01)

(52) U.S. Cl.
CPC ... *G06K 19/0723* (2013.01); *G06K 19/07758* (2013.01); *G06K 19/07773* (2013.01)

(58) Field of Classification Search
CPC ......... G06K 19/0723; G06K 19/07758; G06K 19/07773
USPC ....................................................... 235/492
See application file for complete search history.

(56) References Cited

U.S. PATENT DOCUMENTS

| | | | |
|---|---|---|---|
| 7,125,495 B2 | 10/2006 | Street et al. | |
| 7,319,398 B2 | 1/2008 | Marino | |
| 7,525,487 B2 | 4/2009 | Burnside et al. | |
| 9,594,934 B2 | 3/2017 | Augustinowicz | |
| 9,952,082 B2 | 4/2018 | Schwartz et al. | |
| 10,165,677 B2 | 12/2018 | Mei et al. | |
| 2008/0198011 A1* | 8/2008 | Leper | G08B 13/1445 340/572.1 |
| 2009/0085750 A1* | 4/2009 | Waldner | G06K 19/07749 340/572.7 |
| 2010/0207838 A1* | 8/2010 | Chiu | H01Q 1/20 343/873 |
| 2014/0087657 A1 | 3/2014 | Pienkowski | |
| 2017/0026722 A1 | 1/2017 | Schwartz et al. | |
| 2017/0344772 A1* | 11/2017 | Fislage | G06K 7/10415 |
| 2018/0252659 A1 | 9/2018 | Street et al. | |

* cited by examiner

*Primary Examiner* — Daniel A Hess
(74) *Attorney, Agent, or Firm* — Mueting Raasch Group

(57) ABSTRACT

A near-field communication tag includes a logic section that responds to a radio-frequency identification interrogation signal. An elongated, printed, interconnect has a first end coupled to the integrated circuit. An antenna is on a second end of the interconnect. The antenna is electrically coupled to the conductive lines of the interconnect and operable to send and receive wireless signals of the radio-frequency identification interrogation and communicate the wireless signals with the integrated circuit via the interconnect.

20 Claims, 5 Drawing Sheets

NEAR-FIELD COMMUNICATION DEVICE WITH ANTENNA ON ELONGATED PRINTED INTERCONNECT

SUMMARY

The present disclosure is directed to a near-field communication device with an antenna on an elongated printed interconnect. In one embodiment, a near-field communication (NFC) tag includes an integrated circuit with at least one external interface. The integrated circuit has a logic section that responds to a radio-frequency identification (RFID) interrogation. An interconnect has a first end coupled to the external interface of the integrated circuit. The interconnect has a flexible substrate and printed conductive lines and is elongated in a first direction. An antenna is on a second end of the interconnect, the second end opposed to the first end along the first direction. The antenna is electrically coupled to the conductive lines of the interconnect and operable to send and receive wireless signals of the RFID interrogation and communicate the wireless signals with the integrated circuit via the conductive lines.

In another embodiment, a method involves coupling two or more RFID antennas to an integrated circuit via one or more elongated interconnects. An RFID interrogation signal is detected from an interrogating device via a first subset of the two or more RFID antennas. A second subset different from the first subset is decoupled from the integrated circuit in response to detecting the RFID interrogation signal. A response to the RFID interrogation signal is transmitted via only the first subset of the antennas.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

The present disclosure relates to near-field communications (NFC) devices. Generally, NFC tag devices are passive or active devices that are programmed to transmit data in response to an excitation field by another device in a process known as radio-frequency identification (RFID). The data provided by the tag is often an identifier, e.g., that allows an item to which the tag is attached to be automatically identified by an interrogator device when into proximity to the NFC tag device. NFC tag devices are used in a wide-variety of applications, such as financial transactions, initiating peer-to-peer computer communications, inventory management, etc.

The NFC tag device generally includes one or more antennas to receive the excitation field and to transmit the NFC data from the interrogator as part of the RFID interrogation. The proximity between the interrogator and NFC tag device needed to initiate the data exchange can vary based on as transmission range of the interrogator and the NFC tag device. This distance should be small enough to prevent unwanted activation of the NFC tag device yet far enough away to enable activation under expected use. For example, a personal device such as a cell phone (which can be used as a tag or interrogator) is easily hand held by a person, and so NFC activation distance may be small, e.g., on the order of a few millimeters. In other cases, such as robotics, it may be desirable to have a longer distance, e.g., on the order of 10's of centimeters, to avoid accidental contact between the robotic interrogator and the NFC tag device that could result in damage to one or both.

In the present disclosure, a mechanically robust NFC tag device is described that can be used for large items, such as pallets that are moved in warehouses, loading docks, transport vehicles, etc. Such items may be moved using human or robotic pallet movers (e.g., forklifts), and the pallet movers may include an NFC interrogator to track what is currently being lifted or transported by reading an NFC tag device attached to the item. This can be integrated into an automated inventory tracking system and can provide immediate and accurate tracking of pallets. This type of NFC tag device may be used for other objects besides pallets, such as shipping containers and large individual parts that may benefit from automatic identification via a transport. Similarly, the interrogator may be implemented on any lifting device, e.g., robotic arms, cranes, conveyer belt systems, etc., or other devices such as handheld interrogators.

Figure 1:
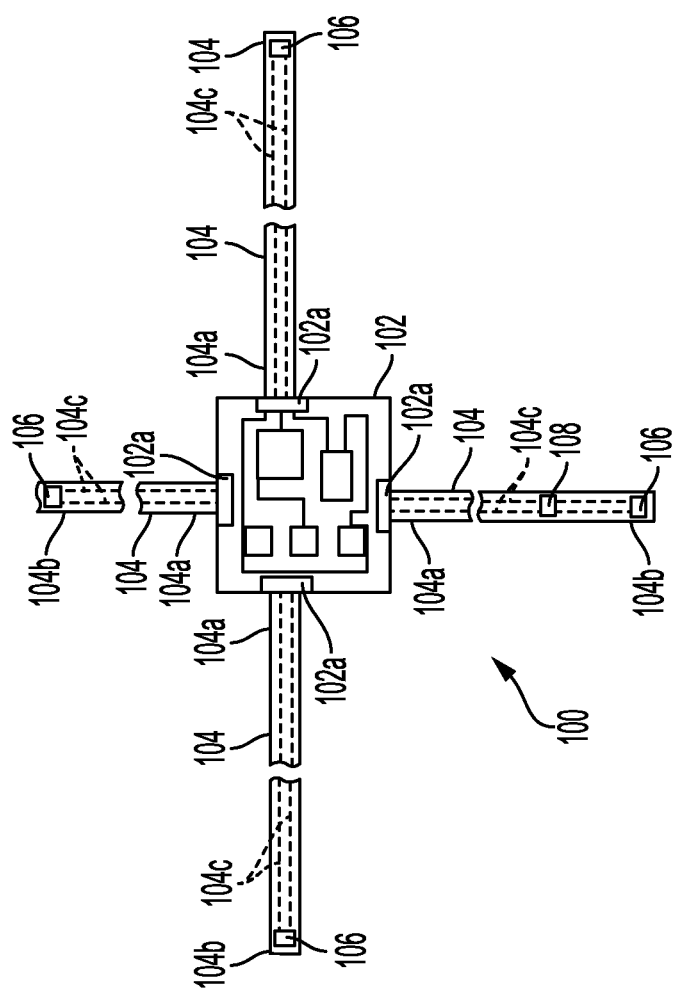
FIG. 1 is a diagram of a near-field communications device according to an example embodiment.

In FIG. 1, a diagram shows an NFC device 100 according to an example embodiment. The device 100 may be configured as one or both of a tag and an interrogator, although in this example the device 100 is described as an NFC tag. The device 100 includes a centralized integrated circuit (IC) 102 that provides at least the electrical circuits that provide device functionality, e.g., providing NFC tag functions as known in the art. The IC 102 may be an active or passive NFC tag device. In the former case, the IC 102 may include or be attached to a local power supply such as a battery. In either case, the IC 102 includes external interfaces 102*a* that are coupled to one or more large-area printed electronics interconnects 104. The interconnects have first ends 104*a* coupled to the external interfaces 102*a* of the integrated circuit 102. The interconnects 104 may be formed by printing conductive traces 104*c* on a flexible substrate using large-area printed electronics processes. The interconnects 104 are elongated in different directions (e.g., vertical and horizontal in this view) and are long relative to typical NFC applications (e.g., on the order of meters, in some applications greater than 0.5 meters).

The interconnects 104 include at least conductive traces 104*c* that couple the IC 102 to devices 106 at second, distal ends 104*b* of the interconnects 104. The distally located devices 106 may be formed using printed electronics together with the interconnects 104, or may be attached after formation of the interconnects, e.g., by bonding, soldering, mechanical connectors. At least one of the distally located devices 106 includes an antenna, the antenna being used in the NFC signaling between the IC 102 and a reader or other external device. The devices 106 may also include sensors, e.g., for temperature, humidity, acceleration, light intensity, etc. By using long, printed, interconnects, the NFC antennas and sensors can be placed strategically around a large object. This allows the NFC IC to be pulsed from any of the touch points defined by the distal devices 106 rather than directly at the IC 102. The interconnects 104 may also have intermediately-located devices, e.g., device 108, that are between the distal devices 106 and the IC 102. The intermediately-located device 108 may include sensors and/or antennas similar to the distal devices 106.

Note that the device 100 is formed at least in part using printed electronics. Conventional electronics (e.g., integrated circuits) are formed by depositing and shaping (e.g., via photoresist) layers onto crystalline silicon wafers or similar semiconductor substrates. In contrast, a printed circuit can use a relatively lower-cost process (e.g., screen printing, inkjet printing) to form circuit elements on a substrate, typically a flexible film. Organic (e.g., carbon-based) materials can be used to form the circuit elements, although non-organic materials may also be used for some printed circuit elements. In the embodiment shown in FIG. 1, the interconnects 104 and devices 106, 108 may be formed by a printed electronics process. Because of the size and end-use of the device 100 described below, at least the interconnects 104 will benefit from being formed on a flexible substrate.

Figure 2:
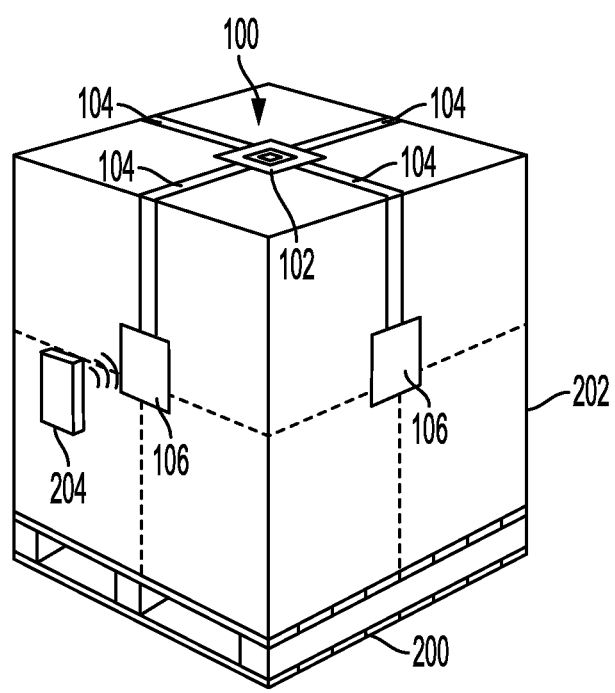
FIGS. 2-4 are perspective views of a near-field communications device on a cargo unit according to example embodiments.

In FIG. 2, the device 100 is shown on a pallet 200 with cargo unit 202 according to an example embodiment. The IC 102 is on the top of the cargo 202 and the distal devices 106 are on the sides of the cargo 202. An NFC interrogator/reader 204 is shown interrogating and reading the NFC tag device 100 at an antenna located on one of the distal devices 106. This remote placement of the antennas of the devices 106 can avoid issues associated with a single tag placed on the top or side of a pallet which is either inaccessible (facing inward), hard to reach, or prone to damage. If two or more of the distal devices 106 include sensors, the NFC tag device 100 can collect sensor data from multiple points on the cargo 202. This approach allows for seamless interaction with data stored on the NFC IC as well as higher fidelity multipoint sensor data which can create a 3-D map of conditions, e.g., temperature, humidity, acceleration, etc. Additionally, sensitive parts of the NFC tag device 100 like the IC 102 can be placed in an area less prone to damage.

Figure 3:
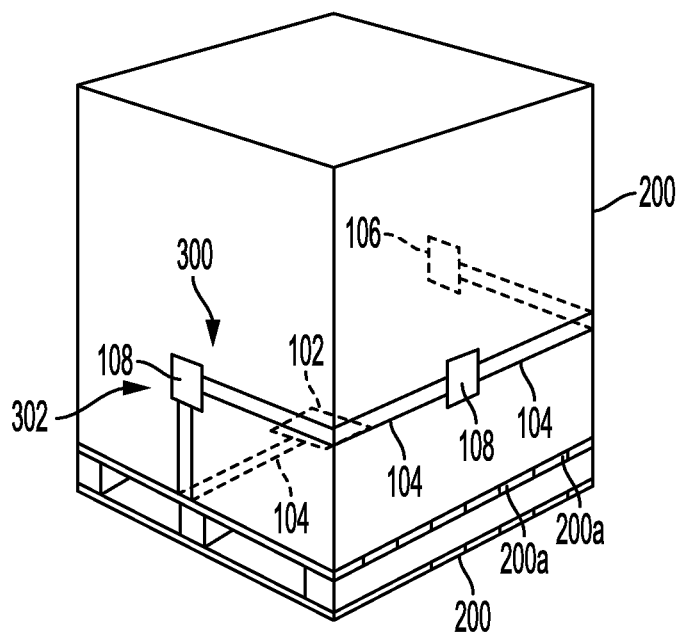

It will be understood there are many variations possible in view of NFC tag devices. In FIG. 3, a perspective view shows an NFC tag device 300 according to another example embodiment. This NFC tag device 300 has an IC 102 that is located between the cargo 202 and the pallet 200. The IC 102 may be attached to a top surface of the pallet 200 if there is an area on the pallet 200 where the cargo 202 won't crush or otherwise damage the IC 102. Otherwise, the IC 102 may be located on a protected inner surface of the pallet 200, e.g., on an inward facing edge of one of the slats 200*a*.

The NFC tag device 300 has two intermediately-located devices 108 and one distal device 106 arranged around different outer surfaces of the cargo 202. Note that the leftmost intermediate device 108 forms a right-angled junction 302 between two interconnects 104. In other embodiments, intermediate devices may be placed at t-sections or junctions with more than two interconnects 104. In other arrangements, interconnects 104 may form a right angle (or other junction type) without any intermediate devices 108 located at the junction/angle.

Figure 4:
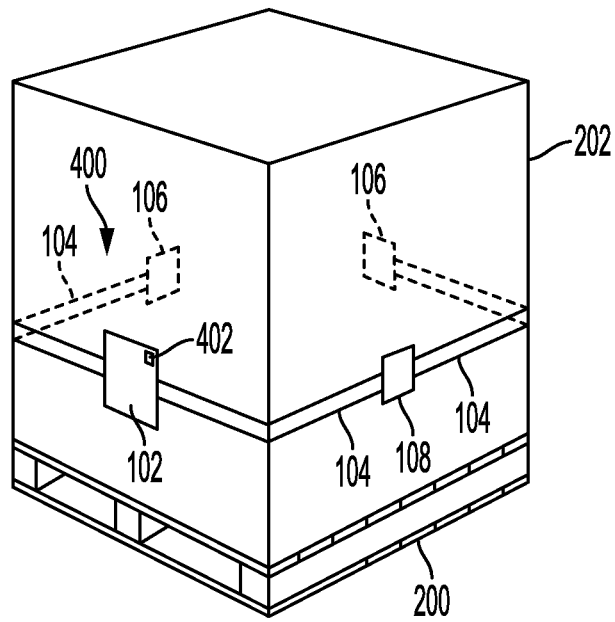

In FIG. 4, a perspective view shows an NFC tag device 400 according to another example embodiment. This NFC tag device 400 has an IC 102 that is located on an outer surface of the cargo 202. The NFC tag device 400 has two distal devices 106 and one intermediate device 108, all of which are arranged around different outer surfaces of the cargo 202. Because the IC 102 is on an outer surface of the cargo 102, it may also include an antenna and or sensor as indicated by block 402.

Figure 5:
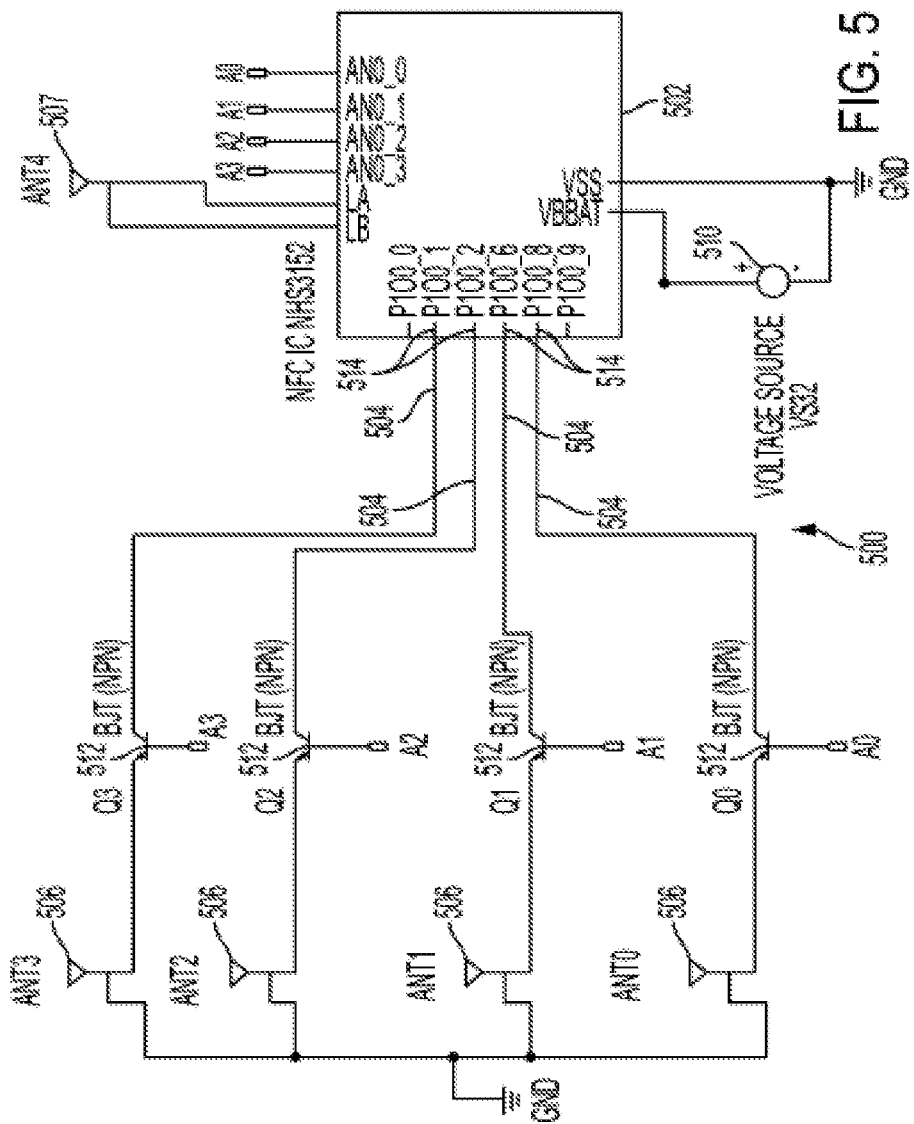
FIG. 5 is a circuit diagram of a near-field communications device according to an example embodiment.

In FIG. 5, a circuit diagram shows an NFC tag device 500 according to an example embodiment. An IC 502 is coupled to antennas 506 by way of printed interconnects 504. Another antenna 507 is located proximate to the IC 502 package. The antenna 507 can be configured to act like a wake switch. If a reader is detected via the antenna 507, the antenna 507 activates the IC 502. This mechanism is used to conserve power and use the IC 502 only when needed. This device 500 is an active device that is coupled to a power supply 510. In series with each of the antennas 506 are switching devices 512, e.g., transistors. The IC 502 switches the antennas 506 via control lines A0-A3 that are coupled to the switching devices 512.

The switches 512 allow for sending a response to a selected antenna, and limiting noise from the other antennas. For example, when a mobile device interrogates a selected one of the multiple antennas 506 (e.g., ANT3), the interrogated antenna ANT3 is identified. This identification can be made because the antennas 506 are individually coupled to different input-output ports 514 on the IC 502, and typically the antennas 506 are separated sufficiently from each other that primarily one (although in some situations more than one) antenna will receive the interrogation signal, e.g., the antenna separation distance is greater than a transmission range of the interrogating device.

When responding, the logic circuit 502 of the NFC tag couples only the selected antenna ANT3 to respond, momentarily switching the other antennas (e.g., ANT0-ANT2) off via the switching devices 512. If the others ANT0-ANT2 of the multiple antennas 506 are within transmission range of the mobile device, this will eliminate interference from these other antennas ANT0-ANT2. Even if the others ANT0-ANT2 of the multiple antennas 506 are not within receiving range of the mobile device, inhibiting transmission via those other antennas ANT0-ANT2 may provide other benefits, e.g., reduce power consumption, increased security, etc. It will be understood that other means may be used to selectively transmit from a subset of the antennas 506. For example, a first subset of the ports 514 could be activated to transmit via a first subset of antennas, a second subset of the ports 514 not in the first subset being deactivated during transmission.

In one arrangement, a gate signal is cycled through A0-A3 synchronized with the data stream from the corresponding 504 links. This pattern allows any reader listening to pick up data stream from only one antenna at a given time. The frequency of the gate switching cycle can be programmed through 502. The gate signals sent through A0-A3 (or any subset thereof) can also be switched on simultaneously in order to transmit data using an antenna diversity technique, e.g., spatial diversity. This allows the receiver to more accurately receive the data if it is positioned in between two or more antenna 506.

For example, if a device interrogates the NFC tag device and the signal strength of the interrogation signal from ANT1 and ANT2 are above some threshold, then the IC 502 may be configured to send the response via both ANT1 and ANT2, while switching off ANT0 and ANT3 via associated switching devices 512. Further, the relative strength of the interrogation signal received and ANT1 and ANT2 can be used to select signal strength of the response sent via ANT1 and ANT2. Other data known by the IC2 may also be used to condition the diversity transmissions. For example, if a distance between responding antennas ANT1 and ANT2 is known, this together with the signal strengths of the interrogation signals can be used to estimate a location of the interrogating device. Certain aspects of the response signal (e.g., relative phase angle) may be adjusted based on this estimated location.

Figure 6:
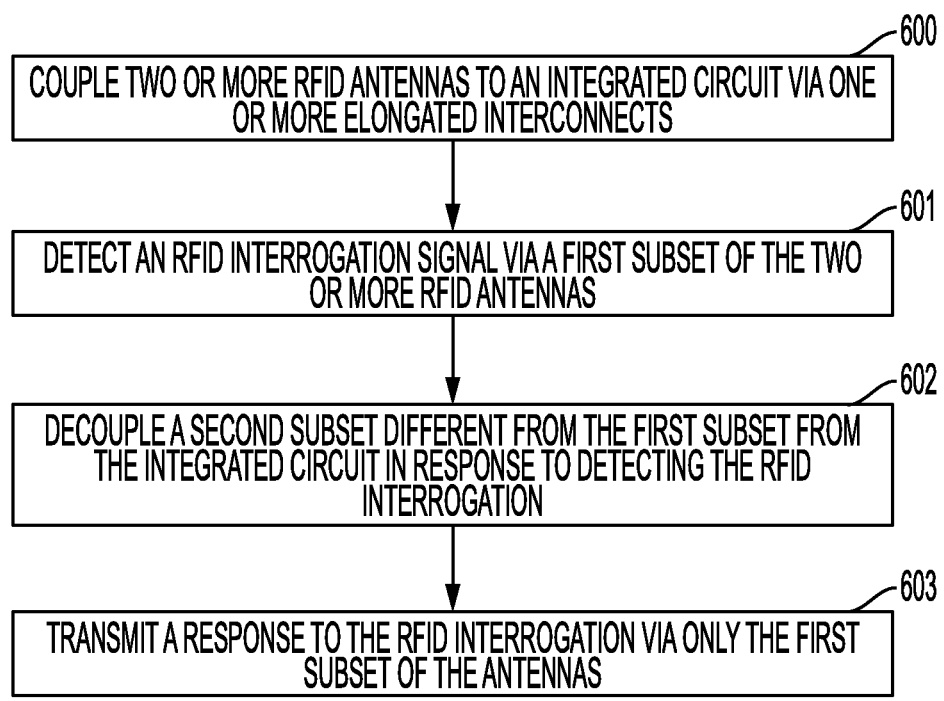
FIG. 6 is a flowchart illustrating a method according to an example embodiment.

In FIG. 6, a flowchart shows a method according to an example embodiment. The method involves coupling 600 two or more RFID antennas to an integrated circuit via one or more elongated interconnects. An RFID interrogation signal is detected 601 via a first subset of the two or more RFID antennas. A second subset different from the first subset is decoupled 602 from the integrated circuit in response to detecting the RFID interrogation, a response to the RFID interrogation is transmitted via only the first subset of the antennas.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A near-field communication (NFC) tag, comprising:
   an integrated circuit comprising at least one external interface, the integrated circuit comprising a logic section that responds to a radio-frequency identification (RFID) interrogation;
   an interconnect having a first end coupled to the external interface of the integrated circuit, the interconnect comprising a flexible substrate and printed conductive lines, the interconnect elongated a distance of at least 0.5 meters along a first direction; and
   an antenna on a second end of the interconnect, the second end opposed to the first end along the first direction, the antenna electrically coupled to the conductive lines of the interconnect and operable to send and receive wireless signals of the RFID interrogation and communicate the wireless signals with the integrated circuit via the conductive lines.

2. The NFC tag of claim 1, further comprising a sensor on the second end of the interconnect, the sensor coupled to the integrated circuit via the conductive lines of the interconnect and operable to send sensor signals to the integrated circuit.

3. The NFC tag of claim 1, further comprising:
   a second interconnect coupled to the external interface of the integrated circuit, the second interconnect comprising a second flexible substrate and second printed conductive lines, the interconnect elongated in a second direction different than the first direction; and
   a second antenna on a distal end of the second interconnect, the second antenna electrically coupled to the second conductive lines of the second interconnect and operable to send and receive wireless signals of the RFID interrogation and communicate the wireless signals with the integrated circuit via the second conductive lines.

4. The NFC tag of claim 3, further comprising a first sensor on the second end of the interconnect and a second sensor on the distal end of the second interconnect, the first and second sensors coupled to the integrated circuit via the respective conductive lines and second conductive lines and operable to send multiple sensor signals to the integrated circuit, the multiple sensor signals used to determine a three-dimensional sensor reading.

5. The NFC tag of claim 3, wherein the antenna and the second antenna are separated by a distance greater than a transmission distance of an RFID interrogating device.

6. The NFC tag of claim 3, wherein the integrated circuit is configured to:
   detect that one of the antenna and the second antenna received the RFID interrogation; and
   couple only the detected antenna to the external interface before sending a response to the RFID interrogation, wherein coupling only the detected antenna prevents interference with the response sent to an interrogating device.

7. The NFC tag of claim 1, wherein the antenna is printed on the interconnect.

8. A near-field communication (NFC) tag, comprising:
   an integrated circuit comprising at least one external interface, the integrated circuit comprising a logic section that responds to a radio-frequency identification (RFID) interrogation;
   an interconnect having a first end coupled to the external interface of the integrated circuit, the interconnect comprising a flexible substrate and printed conductive lines, the interconnect elongated in a first direction;
   an antenna on a second end of the interconnect, the second end opposed to the first end along the first direction, the antenna electrically coupled to the conductive lines of the interconnect and operable to send and receive wireless signals of the RFID interrogation and communicate the wireless signals with the integrated circuit via the conductive line;
   a second interconnect coupled to the external interface of the integrated circuit, the second interconnect comprising a second flexible substrate and second printed conductive lines, the interconnect elongated in a second direction different than the first direction;
   a second antenna on a distal end of the second interconnect, the second antenna electrically coupled to the second conductive lines of the second interconnect and operable to send and receive wireless signals of the RFID interrogation and communicate the wireless signals with the integrated circuit via the second conductive lines; and first and second switching devices in series with the antenna and the second antenna, the integrated circuit coupled to the switching devices and operable to selectively connect the antenna and the second antenna to the external interface of the integrated circuit.

9. The NFC tag of claim 8, wherein the logic section is configured to:

determine a selected one of the antenna and the second antenna received the RFID interrogation; and via the first and second switching devices, couple only the selected one antenna to the external interface before sending a response to the RFID interrogation.

10. The NFC tag of claim 8, further comprising a first sensor on the second end of the interconnect and a second sensor on the distal end of the second interconnect, the first and second sensors coupled to the integrated circuit via the respective conductive lines and second conductive lines and operable to send multiple sensor signals to the integrated circuit, the multiple sensor signals used to determine a three-dimensional sensor reading.

11. The NFC tag of claim 8, wherein the antenna and the second antenna are separated by a distance greater than a transmission distance of an RFID interrogating device.

12. The NFC tag of claim 8, wherein the integrated circuit is configured to:

detect that one of the antenna and the second antenna received the RFID interrogation; and couple only the detected antenna to the external interface before sending a response to the RFID interrogation, wherein coupling only the detected antenna prevents interference with the response sent to an interrogating device.

13. An assembly comprising:

a cargo unit; and a near-field communication (NFC) tag attached to the cargo unit, the NFC tag comprising:

an integrated circuit comprising at least one external interface, the integrated circuit comprising a logic section that responds to a radio-frequency identification (RFID) interrogation;

two or more elongated interconnects having first ends coupled to the external interface of the integrated circuit and second ends opposed to the first ends, the interconnects comprising flexible substrates and printed conductive lines that extend from the first to second ends, the second ends located on respective two or more different sides of the cargo unit; and two or more antennas on the second ends of the respective two or more interconnects, the antenna electrically coupled to the conductive lines of the interconnect and operable to send and receive wireless signals of the RFID interrogation and communicate the wireless signals with the integrated circuit via the conductive lines, wherein an activation of a only selected one of the two or more antennas on a selected side of the two or more sides of the cargo causes the RFID interrogation to occur.

14. The assembly of claim 13, further comprising two or more sensors on the second ends of the respective two or more interconnects, the two or more sensors coupled to the integrated circuit via the conductive lines of the respective two or more interconnects and operable to send multiple sensor signals to the integrated circuit, the multiple sensor signals used to determine a three-dimensional sensor reading.

15. The assembly of claim 13, further comprising two or more switching devices in series with the respective two or more antennas, the integrated circuit coupled to the two or more switching devices and operable to selectively connect the respective two or more antennas to the external interface of the integrated circuit.

16. The assembly of claim 13, wherein the two or more interconnects are each at least 0.5 meters long.

17. The assembly of claim 13, wherein the two or more antennas are printed on the respective two or more interconnects.

18. The assembly of claim 13, further comprising a pallet to which the cargo unit is attached, and wherein the integrated circuit is located between the pallet and the cargo unit.

19. The assembly of claim 13, wherein the two or more antennas are separated by a distance greater than a transmission distance of the interrogating device.

20. The assembly of claim 13, wherein the integrated circuit is configured to:

determine that a subset of the two or more antennas received the RFID interrogation; and couple only the subset to the external interface before sending a response to the RFID interrogation, wherein coupling only the subset prevents interference with the response sent to an interrogating device.

* * * * *